US008615417B2

(12) United States Patent
Hamasaki

(10) Patent No.: US 8,615,417 B2
(45) Date of Patent: Dec. 24, 2013

(54) SUPPLY PLAN CONTROL METHOD AND COMPUTER-READABLE RECORDING MEDIUM HAVING RECORDED SUPPLY PLAN CONTROL PROGRAM

(75) Inventor: Takenori Hamasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 2135 days.

(21) Appl. No.: 11/365,686

(22) Filed: Mar. 2, 2006

(65) Prior Publication Data
US 2007/0088593 A1 Apr. 19, 2007

(30) Foreign Application Priority Data
Oct. 19, 2005 (JP) .................................. 2005-303867

(51) Int. Cl.
*G06Q 10/00* (2012.01)

(52) U.S. Cl.
USPC .......................................... 705/7.12; 705/28

(58) Field of Classification Search
USPC ............................... 705/8, 7.12, 28
See application file for complete search history.

(56) References Cited

U.S. PATENT DOCUMENTS

| | | | | |
|---|---|---|---|---|
| 5,974,395 | A * | 10/1999 | Bellini et al. | 705/9 |
| 6,167,380 | A * | 12/2000 | Kennedy et al. | 705/10 |
| 6,341,266 | B1 * | 1/2002 | Braun | 705/7 |
| 6,701,299 | B2 * | 3/2004 | Kraisser et al. | 705/8 |
| 6,895,384 | B1 * | 5/2005 | Dalal | 705/8 |
| 7,085,729 | B1 * | 8/2006 | Kennedy et al. | 705/10 |
| 7,395,237 | B1 * | 7/2008 | Hall et al. | 705/37 |
| 2002/0019761 | A1 * | 2/2002 | Lidow | 705/10 |
| 2002/0035515 | A1 * | 3/2002 | Moreno | 705/26 |
| 2002/0069121 | A1 * | 6/2002 | Jain et al. | 705/26 |
| 2003/0060924 | A1 * | 3/2003 | Ye et al. | 700/217 |
| 2004/0068430 | A1 * | 4/2004 | Peachey-Kountz et al. | 705/10 |
| 2006/0171257 | A1 * | 8/2006 | Cormier et al. | 368/47 |

OTHER PUBLICATIONS

Patent Abstracts of Japan, Publication No. 2000-293595, Published Oct. 20, 2000.

* cited by examiner

*Primary Examiner* — Susanna M Meinecke Diaz
(74) *Attorney, Agent, or Firm* — Fujitsu Patent Center

(57) ABSTRACT

A supply plan control method which allows an effective product supply plan to be made, ensuring equality among orderers in different time zones. When an order for a subject of transaction is specified, a possible allocation recipient customer extraction section extracts a customer servicing at the time when the order is accepted as a possible allocation recipient customer, in accordance with the business hours and the standard time in the location of the customer. A possible allocation quantity determination section calculates a planned allocation quantity for the possible allocation recipient customer in accordance with a planned supply quantity, and subtracts a quantity actually allocated to any customer from the planned allocation quantity for the possible allocation recipient customer to determine a possible allocation quantity. An allocation section allocates the subject of transaction from the possible allocation quantity for the possible allocation recipient customer in accordance with the order.

9 Claims, 17 Drawing Sheets

111 CUSTOMER MASTER TABLE

| CUSTOMER CODE | CUSTOMER NAME | COUNTRY CODE | ADDRESS AND THE LIKE | START TIME | END TIME | PRIORITY LEVEL |
|---|---|---|---|---|---|---|
| CUSTOMER01 | XXXXX | US | ... | 8:00 | 18:00 | 2 |
| CUSTOMER02 | YYYYY | DE | ... | 8:00 | 18:00 | 3 |
| CUSTOMER03 | ZZZZZ | SG | ... | 8:00 | 18:00 | 4 |
| COMMON | COMMON | XX | ... | 0:00 | 24:00 | 1 |

FIG. 5

112 COUNTRY MASTER TABLE

| COUNTRY CODE | COUNTRY NAME | TIME-ZONE DIFFERENCE (H) |
|---|---|---|
| US | UNITED STATES | -17 |
| DE | GERMANY | -8 |
| SG | SINGAPORE | -1 |
| JP | JAPAN | 0 |

FIG. 6

113 SUPPLY PLAN MASTER TABLE

(AS OF 08:00, 2005/04/01)

| PRODUCT NAME | PLANNED SUPPLY DATE | PLANNED SUPPLY QUANTITY |
|---|---|---|
| ITEM01 | 2005/05/01 | 150 |
| ITEM01 | 2005/05/02 | 50 |
| ITEM02 | 2005/05/02 | 100 |

FIG. 7

114 FORECAST MASTER TABLE (AS OF 08:00, 2005/04/01)

| CUSTOMER CODE | PRODUCT NAME | DESIRED DATE | PLANNED ORDER QUANTITY |
|---|---|---|---|
| CUSTOMER01 | ITEM01 | 2005/05/01 | 50 |
| CUSTOMER01 | ITEM01 | 2005/05/02 | 50 |
| CUSTOMER02 | ITEM01 | 2005/05/01 | 100 |
| CUSTOMER02 | ITEM02 | 2005/05/02 | 100 |

FIG. 8

115 ORDER INFORMATION MANAGEMENT TABLE

| ORDER NUMBER | DATE OF ACCEPTANCE | TIME OF ACCEPTANCE | CUSTOMER CODE | · · · |
|---|---|---|---|---|
| PO-01 | 2005/04/01 | 09:00 | CUSTOMER01 | · · · |
| PO-02 | 2005/04/01 | 17:00 | CUSTOMER02 | · · · |
| PO-03 | 2005/04/02 | 02:00 | CUSTOMER01 | · · · |
| PO-04 | 2005/04/02 | 05:00 | CUSTOMER02 | · · · |

FIG. 9

116 ORDER INFORMATION TABLE

| ORDER NUMBER | LINE NUMBER | PRODUCT NAME | DESIRED DELIVERY DATE | DESIRED QUANTITY | OFFERED DELIVERY DATE |
|---|---|---|---|---|---|
| PO-01 | 0001 | ITEM01 | 2005/05/01 | 60 | 2005/05/02 |
| PO-02 | 0001 | ITEM01 | 2005/05/01 | 70 | 2005/05/01 |
| PO-02 | 0002 | ITEM02 | 2005/05/02 | 50 | 2005/05/02 |
| PO-03 | 0001 | ITEM01 | 2005/05/01 | 10 | 2005/05/01 |
| PO-03 | 0002 | ITEM01 | 2005/05/02 | 10 | 2005/05/02 |
| PO-04 | 0001 | ITEM01 | 2005/05/01 | 20 | 2005/05/01 |

US 8,615,417 B2

SUPPLY PLAN CONTROL METHOD AND COMPUTER-READABLE RECORDING MEDIUM HAVING RECORDED SUPPLY PLAN CONTROL PROGRAM

CROSS-REFERENCE TO RELATED APPLICATIONS

This application is based on, and claims priority to, Japanese Application No. 2005-303867, filed on Oct. 19, 2005, in Japan, and which is incorporated herein by reference.

BACKGROUND OF THE INVENTION

1. Field of the Invention

The present invention relates to supply plan control methods and computer-readable recording media which have recorded a supply plan control program for accepting an order placed by a plurality of orderers distributed over remote places, and particularly to a supply plan control method and a computer-readable recording medium which has recorded a supply plan control program for accepting an order placed by orderers located in different time zones.

2. Description of the Related Art

Both domestic and international business transactions have been increasing. A purchase order handling system is used to accept orders from customers in different countries. The purchase order handling system accepts an order for a product from a customer in a foreign country and performs allocation in accordance with the supplier's supply plan. Then, the purchase order handling system returns shipment information (offered delivery date and the like) to the ordering terminal in the country (for instance, refer to Japanese Application No. 2000-293595).

Inventory-and-supply control methods for accepting an order, performing allocation, and offering a delivery date perform management on an equality basis or on a customer-by-customer basis. When a customer places an order for a product, the equality-basis inventory-and-supply control method allocates the ordered quantity of the product to the customer from the common inventory, as the product to be supplied. The customer-by-customer basis inventory-and-supply control method has stock products reserved for individual customers in advance. When a customer places an order for a product, the product to be supplied to the customer is allocated from the stock product reserved for the customer.

If the purchase order handling system operates 24 hours a day and accepts an order placed by different countries at any time of day or night, any of the conventional inventory-and-supply control methods will have problems as described later. An optimum supply plan should be managed especially for international transactions in consideration of time-zone differences.

FIG. 17 is a view showing examples of product allocation by conventional inventory-and-supply control methods. The upper half of FIG. 17 shows product management on an equality basis, and the lower half shows product management on a customer-by-customer basis.

The figure shows orders placed for a product and the allocation of the product on May 1. According to product demand forecasts for May 1, 150 pieces are to be manufactured as the pieces to be sold on May 1, 50 pieces are to be sold to an American customer, and 100 pieces are to be sold to a German customer.

In the shown example, a 24-hour day starts at 8:00 in the morning. The supplier located in Japan receives a first order for 60 pieces from the American customer at 9:00 Japan Time (order number P0-01:0001). The supplier receives a second order for 70 pieces from the German customer at 17:00 Japan Time (order number P0-02:0001). A third order for 10 pieces comes from the American customer at 2:00 on the next day Japan Time (order number P0-03:0001). A fourth order for 20 pieces comes from the German customer at 5:00 Japan Time (order number P0-04:0001). The local time of the American customer is 17 hours behind the Japan Time, and the local time of the German customer is 8 hours behind the Japan Time.

Product management on an equality basis (upper half of FIG. 17) will be described first. When the first order (order number P0-01:0001) is received, 60 pieces are allocated to the American customer, and 90 (150–60) pieces remain in stock. When the second order (order number P0-02:0001) is received, 70 pieces are allocated to the German customer, and 20 (90-70) pieces remain in stock. When the third order (order number P0-03:0001) is received, 10 pieces are allocated to the American customer, and 10 (20–10) pieces remain in stock. When the fourth order (order number P0-04:0001) is received, the last 10 pieces in stock are allocated to the German customer. Nothing (10–10=0) remains in stock, and the German customer is short by 10 pieces.

The American customer has placed an order for 70 pieces in total, beyond a forecast of 50 pieces, and receives allocation of all the 70 pieces. The German customer has placed an order for 90 pieces in total, lower than a forecast of 100 pieces, and faces a supply shortage. Product management on an equality basis has the following problems:

Product allocation is performed in order in which orders are placed regardless of time-zone differences, causing inequality among countries due to the time-zone differences.

The time when the latest supply plan is incorporated into the inventory information can be outside the local business hours of a customer. If a customer places a large-volume order immediately after the supply plan of a day is incorporated into the inventory information and if the incorporation time is outside the local business hours of another customer, the customer cannot receive production allocation of the day. The disregard for the time-zone differences will cause this type of inequality.

Product management on a customer-by-customer basis (lower half of FIG. 17) will be described next. When the product is managed on a customer-by-customer basis, stock products are reserved in accordance with the supply plan.

When the first order (order number P0-01:0001) is received, 50 pieces are reserved as stocks for the American customer, and all those 50 pieces are allocated to the American customer. Stocks reserved for the American customer becomes 0 (50–50), and the American customer is short by 10 pieces. When the second order (order number P0-02:0001) is received, 70 pieces are allocated to the German customer from the stocks reserved for the German customer, and 30 (100–70) pieces remain as stocks reserved for the German customer. When the third order (order number P0-03:0001) is received, nothing is allocated to the American customer because no stocks are reserved for the American customer, and the American customer is short by another 10 pieces. When the fourth order (order number P0-04:0001) is placed, 20 pieces are allocated to the German customer from the stocks reserved for the German customer, and 10 (30–20) pieces remain as stocks reserved for the German customer.

Although product allocation to the American customer is insufficient, excess inventory is carried for the German customer. This causes the following problems:

It is difficult to perform optimum management for all the customers. A supply plan is drawn up generally in accordance with demand forecasts, but it is difficult to estimate orders from general customers accurately. Accordingly, there is often a difference between the plan and the record. The difference will produce excess inventory or can cause the supplier to miss a business opportunity due to insufficient inventory.

SUMMARY OF THE INVENTION

In view of the foregoing, it is an object of the present invention to provide a supply plan control method and a computer-readable recording medium which has recorded a supply plan control program which allow an efficient product supply plan to be set up for orderers placed by customers located in different time zones, without impairing equality.

To accomplish the above object, the present invention provides a supply plan control method for managing a supply plan of a subject of transaction to a customer by means of a computer. In this supply plan control method, the computer determines the planned supply quantity of the subject of transaction in a certain period; stores the locations and local business hours of the customer in advance; when an order for the subject of transaction is placed with the certain period specified as the delivery time, extracts a customer servicing at the time when the order is accepted as a possible allocation recipient customer, in accordance with the local business hours of the customer and the standard time in the location of the customer; calculates a planned allocation quantity for the possible allocation recipient customer in accordance with the planned supply quantity, and subtracts a quantity already allocated to any customer from the planned allocation quantity for the possible allocation recipient customer to determine a possible allocation quantity; allocates the subject of transaction from the possible allocation quantity for the possible allocation recipient customer in accordance with the order; and specifies the allocated quantity as the allocated quantity for the possible allocation recipient customer.

To accomplish the above object, the present invention provides a computer-readable recording medium which has recorded a supply plan control program for managing a supply plan of a subject of transaction to a customer. The supply plan control program recorded on the recording medium causes the computer to function as a planned supply quantity determination section for determining a planned supply quantity of the subject of transaction in a certain period; a possible allocation recipient customer extraction section for storing the location and local business hours of the customer in advance, and when an order for the subject of transaction is placed with the certain period specified as the delivery time, extracting a customer servicing at the time when the order is accepted as a possible allocation recipient customer, in accordance with the local business hours of the customer and the standard time in the location of the customer; a possible allocation quantity determination section for calculating a planned allocation quantity for the possible allocation recipient customer in accordance with the planned supply quantity, and subtracting a quantity actually allocated to any customer from the planned allocation quantity for the possible allocation recipient customer to determine a possible allocation quantity; an allocation section for allocating the subject of transaction from the possible allocation quantity for the possible allocation recipient customer in accordance with the order; and an allocated quantity specification section for specifying the allocated quantity as an allocated quantity for the possible allocation recipient customer.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a view showing an example data structure of a customer master table.
FIG. 6 is a view showing an example data structure of a country master table.
FIG. 7 is a view showing an example data structure of a supply plan master table.
FIG. 8 is a view showing an example data structure of a forecast master table.
FIG. 9 is a view showing an example data structure of an order information management table.

DESCRIPTION OF THE PREFERRED EMBODIMENTS

An embodiment of the present invention will be described with reference to the drawings.

Figure 1:
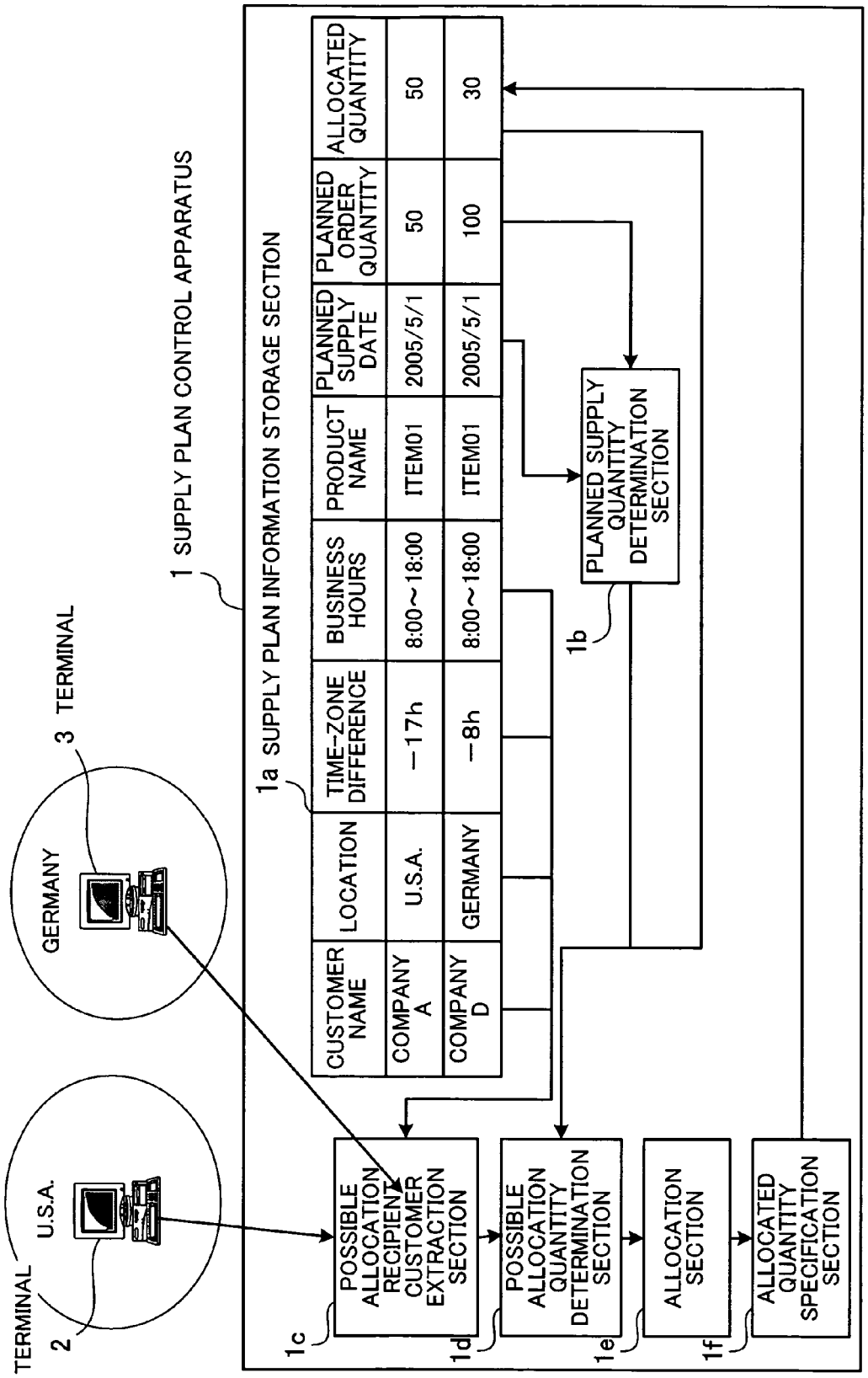
FIG. 1 is a view showing an overview of an embodiment.

FIG. 1 is a view showing an overview of the present embodiment. A supply plan control apparatus 1 determines a supply plan of a subject of transaction in accordance with an order placed from a terminal 2 or 3. The supply plan control apparatus 1 includes a supply plan information storage section 1a, a planned supply quantity determination section 1b, a possible allocation recipient customer extraction section 1c, a possible allocation quantity determination section 1d, an allocation section 1e, and an allocated quantity specification section 1f.

The supply plan information storage section 1a stores information necessary for the supply plan. In an example shown in FIG. 1, the supply plan information storage section 1a stores the customer name, the location of the customer, the time-zone difference between the place where the order is accepted and the location of the customer, the local business hours of the customer, the name of the target product, the planned supply date, the planned order quantity, and the allocated quantity, in association with one another. The customer name, the location, the time-zone difference, and the local business hours are items specified one each for a single customer. The product name, the planned supply date, the planned order quantity, and the allocated quantity are specified for each combination of the customer name, the product name, and the planned supply date.

The planned supply quantity determination section $1b$ determines a planned supply quantity of the subject of transaction in a certain period. In the example shown in FIG. 1, the certain period is specified in days. The subject of transaction can be specified by a product name, for example. The planned supply quantity determination section $1b$ can specify a total of planned order quantities of the subject of transaction ordered by the customers in a certain period as the planned supply quantity.

When an order for the subject of transaction is entered from the terminal 2 or 3 with the certain period specified as the delivery time, the possible allocation recipient customer extraction section $1c$ extracts a customer servicing at the time when the order is accepted, as a possible allocation recipient customer, in accordance with the local business hours of the customer and the standard time in the location of the customer. The standard time in the location of the customer can be obtained by adding the value of time-zone difference in the location of the customer to the time of the internal clock of the supply plan control apparatus 1. Whether the customer is servicing can be determined by checking whether the standard time in the location of the customer is within the local business hours.

The possible allocation recipient customer extraction section $1c$ always extracts the customer who has placed the order as a possible allocation recipient customer, irrespective of the local business hours. The possible allocation recipient customer extraction section $1c$ can also extract a customer who is not servicing and does not start servicing before the planned supply quantity is updated next, as a possible allocation recipient customer.

The possible allocation quantity determination section $1d$ calculates a possible allocation quantity of the subject of transaction for the possible allocation recipient customer within the delivery time, in accordance with the planned supply quantity determined by the planned supply quantity determination section $1b$. For instance, the possible allocation quantity determination section $1d$ divides the planned order quantity of the possible allocation recipient customer by the total of the possible order quantities of the subject of transaction from customers within the certain period, multiplies the quotient by the planned supply quantity, and specifies the result as the planned allocation quantity. The possible allocation quantity determination section $1d$ further obtains the possible allocation quantity by subtracting the quantity already allocated to an arbitrary customer from the planned allocation quantity for the possible allocation recipient customer.

The allocation section $1e$ allocates the subject of transaction from the possible allocation quantity for the possible allocation recipient customer, in accordance with the order.

The allocated quantity specification section $1f$ specifies the allocated quantity as the allocated quantity for the possible allocation recipient customer. If the quantity allocated to the possible allocation recipient customer is a non-zero value, a newly specified allocated quantity is added to the previous setting. The allocated quantity is specified within the range of the planned supply quantity calculated for the corresponding customer.

If a plurality of possible allocation recipient customers are found, a customer who has placed an order, for instance, takes priority, and the allocated quantity is specified for the customer with high priority. Among the other customers, who have not placed the order, a possible allocation recipient customer is selected, for instance, in order of priority levels specified in advance, and the allocated quantity is specified for the selected possible allocation recipient customer with high priority.

In the supply plan control apparatus, the planned supply quantity determination section $1b$ determines the planned supply quantity of the subject of transaction in a certain period. When an order for the subject of transaction is entered with the certain period specified as the delivery time, the possible allocation recipient customer extraction section $1c$ extracts a customer servicing at the time when the order is accepted as a possible allocation recipient customer, in accordance with the local business hours of the customer and the standard time in the location of the customer. The possible allocation quantity determination section $1d$ obtains a planned allocation quantity for the possible allocation recipient customer in accordance with the planned supply quantity, subtracts a quantity already allocated to an arbitrary customer from the planned allocation quantity for the possible allocation recipient customer, and determines the possible allocation quantity. The allocation section $1e$ allocates the subject of transaction from the possible allocation quantity for the possible allocation recipient customer in accordance with the order. The allocated quantity specification section $1f$ specifies the allocated quantity as the allocated quantity for the possible allocation recipient customer.

The planned allocation quantity of the subject of transaction reserved for each customer will not be allocated to another customer while the customer is not servicing, especially in a period preceding the business hours within the certain period. As a result, inequality due to the time-zone differences among the locations of customers can be eliminated, and the supplier will not let a business opportunity slip away.

The embodiment will be described in further detail.

Figure 2:
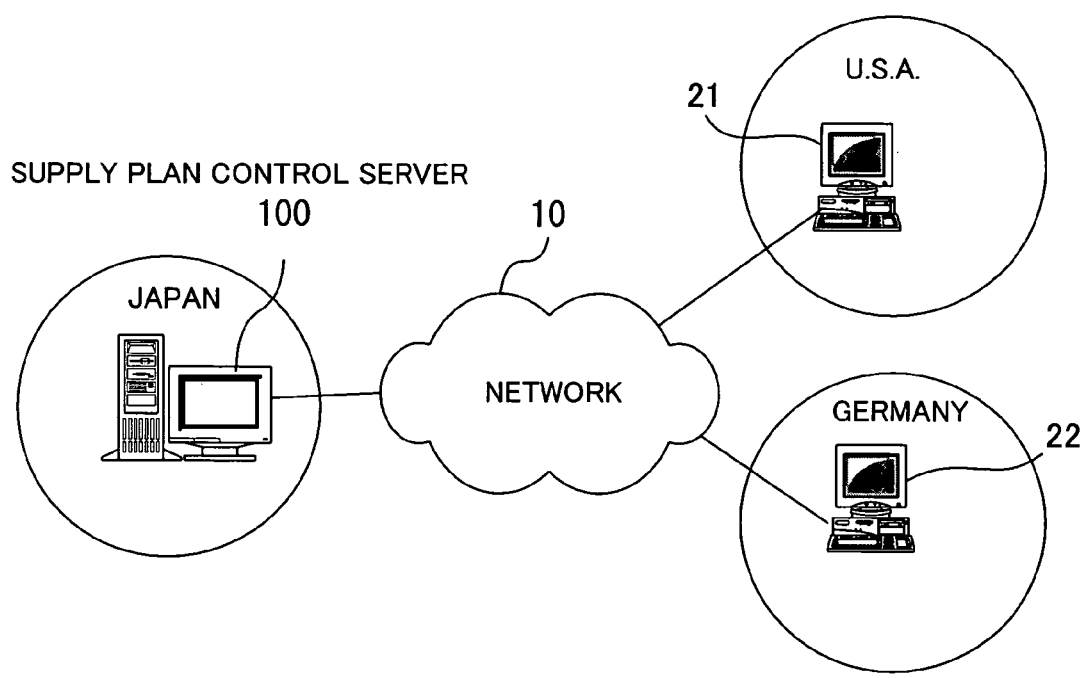
FIG. 2 is a view showing an example system configuration of the embodiment.

FIG. 2 is a view showing an example system configuration of the present embodiment. The system of the present embodiment has a supply plan control server 100 placed in Japan. The supply plan control server 100 is connected through a network 10 to ordering terminals 21 and 22. The terminal 21 is placed in the U.S.A., and the terminal 22 is placed in Germany. In this system, the supply plan control server 100 accepts an order placed by the American or German customer and allocates stocks in accordance with the order.

Figure 3:
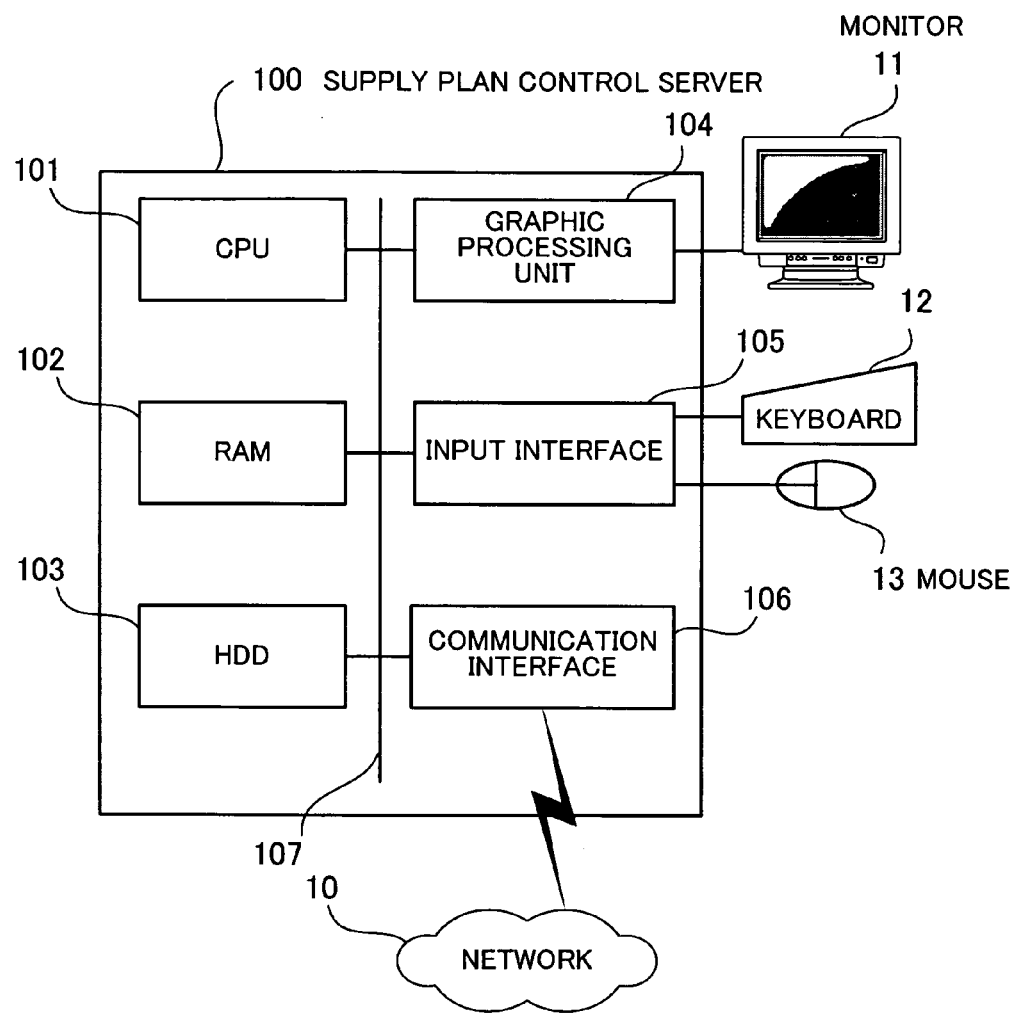
FIG. 3 is a view showing an example hardware configuration of a supply plan control server used in the embodiment.

FIG. 3 is a view showing an example hardware configuration of the supply plan control server used in the present embodiment. The entire supply plan control server 100 is controlled by a central processing unit (CPU) 101. The CPU 101 is connected through a bus 107 to a random access memory (RAM) 102, a hard disk drive (HDD) 103, a graphic processing unit 104, an input interface 105, and a communication interface 106.

The RAM 102 temporarily stores at least a part of the operating system (OS) and an application program which run on the CPU 101. The RAM 102 also stores a variety of data needed for processing by the CPU 101. The HDD 103 stores the OS and the application program.

The graphic processing unit 104 is connected to a monitor 11. The graphic processing unit 104 displays an image on the screen of the monitor 11 as instructed by the CPU 101. The input interface 105 is connected to a keyboard 12 and a mouse 13. The input interface 105 sends a signal sent from the keyboard 12 or the mouse 13, through the bus 107 to the CPU 101.

The communication interface 106 is connected to the network 10. The communication interface 106 exchanges data with another computer through the network 10.

With the hardware configuration as described above, the processing functions of the present embodiment can be implemented. The terminals 21 and 22 can be implemented by a hardware configuration similar to the hardware configuration of the supply plan control server 100 shown in FIG. 3.

Figure 4:
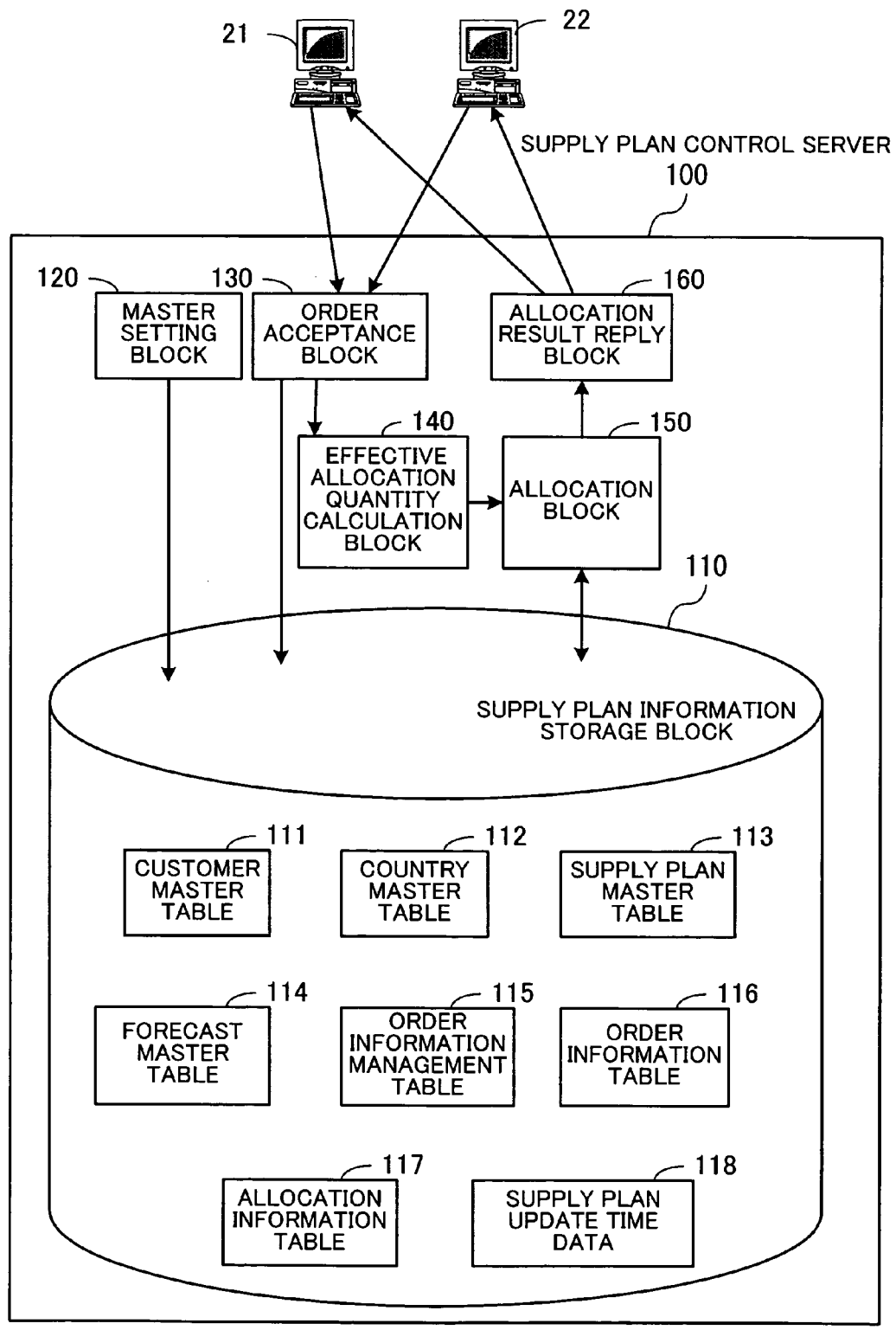
FIG. 4 is a block diagram showing the functions of the supply plan control server.

FIG. 4 is a block diagram showing the functions of the supply plan control server. The supply plan control server 100 has a supply plan information storage block 110, a master setting block 120, an order acceptance block 130, an effective allocation quantity calculation block 140, an allocation block 150, and an allocation result reply block 160.

The supply plan information storage block 110 stores information used to make a supply plan. A part of the storage area of the HDD 103 is used as the supply plan information storage block 110, for instance.

The supply plan information storage block 110 stores a customer master table 111, a country master table 112, a supply plan master table 113, a forecast master table 114, an order information management table 115, an order information table 116, an allocation information table 117, and supply plan update time data 118.

The customer master table 111 is a data table storing information of a customer including the location or country of the customer (customer list). The country master table 112 is a data table storing information of a country to which a product is supplied. The supply plan master table 113 is a data table storing information of a supply plan determined in accordance with a forecast. The forecast master table 114 is a data table storing a demand forecast for each customer.

The order information management table 115 is a data table storing management information related to order information. The order information table 116 is a data table storing the information of an order placed by a customer.

The allocation information table 117 is a data table storing the allocation status of a product to each customer. The supply plan update time data 118 include information indicating the time when the information is last updated in the supply plan master table 113.

The master setting block 120 specifies data in the customer master table 111, the country master table 112, the supply plan master table 113, and the forecast master table 114, in accordance with entry from the system administrator.

The order acceptance block 130 accepts an order placed by a customer through the terminal 21 or 22. When accepting the order, the order acceptance block 130 stores the information of the order in the order information table 116. The order acceptance block 130 then reports the information of the order placed by the customer to the effective allocation quantity calculation block 140.

The effective allocation quantity calculation block 140 calculates a quantity of the product that can be allocated to the order placed by the customer (effective allocation quantity). The effective allocation quantity calculation block 140 reports the calculated effective allocation quantity to the allocation block 150.

The allocation block 150 allocates the product that can be allocated to the customer who has placed the order. If the effective allocation quantity is smaller than the ordered quantity, the effective allocation quantity of the product is allocated. The allocation block 150 reports the allocation information to the allocation result reply block 160.

The allocation result reply block 160 sends the results of allocation made by the allocation block 150 to the terminals 21 and 22.

The information stored in the supply plan information storage block 110 will be described in further detail.

FIG. 5 is a view showing an example data structure of the customer master table 111. The customer master table 111 has columns of customer code, customer name, country code, address and the like, start time, end time, and priority level. The items of the columns in a row are associated with one another and form a single record of customer information.

In the column of customer code, customer information (customer code) for uniquely identifying a customer is specified. The customer code "COMMON" represents a virtual customer used to specify a common product that can be allocated to any customer at any time.

In the column of customer name, a customer name is specified. The customer name corresponding to the customer code "COMMON" is "common".

In the column of country code, a country code identifying the location of the customer is specified. The country code "US" means the U.S.A., and the country code "DE" means Germany, for instance. The country code corresponding to the customer name "common" is "XX".

In the column of address and the like, personal information of a customer, such as the surface-mail address, telephone number, and e-mail address, is specified.

In the column of start time, the local business start time of the customer is specified in the local time. The start time corresponding to the customer name "common" is "0:00".

In the column of end time, the local business end time of the customer is specified in the local time. The end time corresponding to the customer name "common" is "24:00".

In the column of priority level, the priority level assigned to the customer is specified. The priority level represents a degree of priority with which the product to be allocated is selected when the product reserved for a customer in a forecast is allocated to another customer that has placed an order. A smaller value of priority level means that the product reserved for the customer is allocated to another customer with higher priority. The priority level corresponding to the customer name "common" is "1" (highest priority level). By specifying the priority level of the "common" customer to "1", the "common" product can be allocated with the highest priority level if the planned order quantity of the customer who has placed the order causes a shortage.

FIG. 6 is a view showing an example data structure of the country master table 112. The country master table 112 has columns of country code, country name, and time-zone difference. The items of the columns in a row are associated with one another and form a single record of country information.

In the column of country code, the code of each country is specified. In the column of country name, the name of the country is specified. In the column of time-zone difference, the time-zone difference of the country from the country where the order is accepted (in this example, Japan) is specified.

FIG. 7 is a view showing an example data structure of the supply plan master table 113. The supply plan master table 113 has columns of product name, planned supply date, and planned supply quantity. The items of the columns in a row are associated with one another and form a single record of supply plan.

In the column of product name, a product name is specified. In the column of planned supply date, the planned date when the product is to be supplied to the customer is specified. In the column of planned supply quantity, the quantity of the product to be supplied on the planned supply date is specified.

A product supply plan (supplied product name, planned supply date, and planned supply quantity) is determined on the basis of a common forecast for all the customers. In the shown example, the total of planned order quantities for a product of all the customers on each planned supply date is specified as the planned supply quantity of the product on the planned supply date. The total of the planned order quantities multiplied by any coefficient can be specified as the planned supply quantity, in consideration of any excess and shortage.

The information in the supply plan master table 113 is updated periodically. In the shown example, the information is updated at 8:00 Japan Time every day.

FIG. 8 is a view showing an example data structure of the forecast master table 114. The forecast master table 114 has columns of customer code, product name, desired date, and planned order quantity. The items of the columns in a row are associated with one another and form a single record of demand forecast.

In the column of customer code, a customer code is specified. In the column of product name, a product name is specified. In the column of desired date, a product delivery date desired by the customer is specified. In the column of planned order quantity, the quantity of the product to be ordered by the customer is specified. The planned supply quantity in the supply plan master table 113 is automatically calculated from the planned order quantity.

The information of the forecast master table 114 is updated periodically. In the shown example, the information is updated at 8:00 Japan Time every day.

FIG. 9 is a view showing an example data structure of the order information management table 115. The order information management table 115 has columns of order number, date of acceptance, time of acceptance, and customer code. The items of the columns in a row are associated with one another and form a single record of order management information.

In the column of order number, an order number for uniquely identifying order information sent from the customer is specified. A single item of order information can include orders for a plurality of products. In the column of date of acceptance, the date when the order is accepted is specified. In the column of time of acceptance, the local time when the order is accepted in the accepting country (in this example, Japan) is specified. In the column of customer code, the code of the customer who has placed the order is specified.

Each time an order is accepted, a new record of order information is added to the order information management table 115. The example in FIG. 9 shows the order management information from Apr. 1, 2005 to Apr. 2, 2005.

Figure 10:
FIG. 10 is a view showing an example data structure of an order information table.

FIG. 10 is a view showing an example data structure of the order information table 116. The order information table 116 has columns of order number, LINE number, product name, desired delivery date, desired quantity, and offered delivery date. The items of the columns in a row are associated with one another and form a single record of order information.

In the column of order number, an order number in the order information sent from the customer is specified. In the column of LINE number, a number assigned to each order is specified when a single item of order information sent from a terminal contains a plurality of orders. In the column of product name, the product name of the ordered product is specified. In the column of desired delivery date, a desired delivery date specified with the order is specified. In the column of desired quantity, an ordered quantity of the product is specified. In the column of offered delivery date, the product delivery date determined by the supply plan control server 100 in accordance with the order is specified.

When an order is accepted, a new record of order information is stored in the columns of order number, LINE number, product name, desired delivery date, and desired quantity of the order information table 116. In the column of offered delivery date of the order information table 116, information is specified when the allocation for the accepted order is completed.

In the example shown in FIG. 10, order information of orders of which desired delivery dates are within the range of May 1, 2005 to May 2, 2005 is specified. The order information is associated with the order management information shown in FIG. 9 by the order number. FIGS. 9 and 10 show that a plurality of orders of which desired delivery dates are within the range of May 1, 2005 to May 2, 2005 are accepted within the range of Apr. 1, 2005 to Apr. 2, 2005.

Figure 11:
FIG. 11 is a view showing an example data structure of an allocation information table.

FIG. 11 is a view showing an example data structure of the allocation information table 117. The allocation information table 117 has columns of product name, customer code, offered delivery date, and offered quantity. The items of the columns in a row are associated with one another and form a single record of allocation information.

In the column of product name, the name of an allocated product is specified. In the column of customer code, the code of the customer to which the product is allocated is specified. In the column of offered delivery date, the date when the product is to be delivered is specified. In the column of offered quantity, the quantity of the product to be delivered is specified.

In the allocation information table 117, a new record is specified each time allocation based on an order is performed. The allocation information table 117 shown in FIG. 11 shows information immediately after allocation is performed in accordance with the order information of order number "P0-02".

Figure 12:
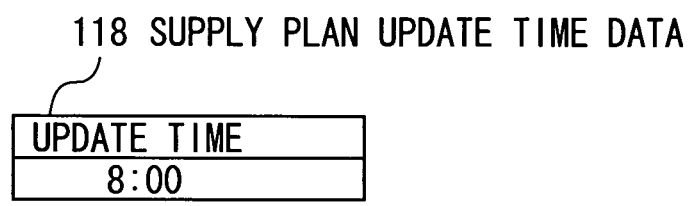
FIG. 12 is a view showing an example of supply plan update time data.

FIG. 12 is a view showing an example of the supply plan update time data 118. The supply plan update time data 118 includes the local time of the product supplier (in this example, Japan Time) when the supply plan master table 113 is updated.

The processing performed by the supply plan control server 100 having the configuration and data as described above will be described. The processing performed by the supply plan control server 100 is broadly divided into master information specification and allocation.

Figure 13:
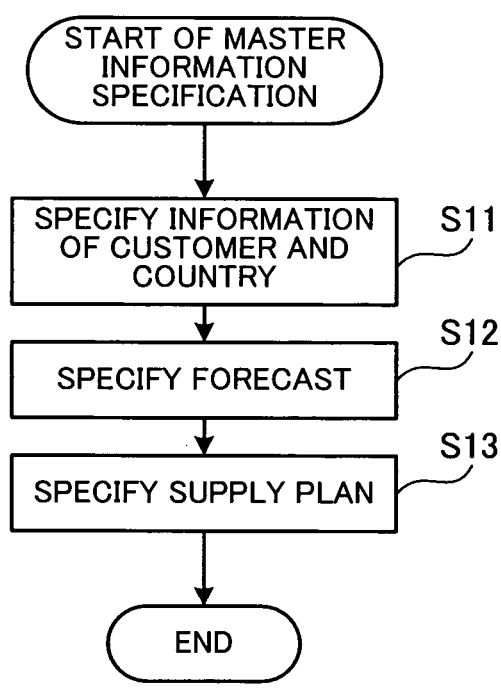
FIG. 13 is a flow chart showing a procedure for specifying master information.

FIG. 13 is a flow chart showing a procedure for specifying master information. The steps shown in FIG. 13 will be described in order of step number. The master information specification is executed when the administrator makes an entry for master information specification through the keyboard and the like of the supply plan control server 100.

Step S11: The master setting block 120 specifies the information of the customer in the customer master table 111 and the information of the country in the country master table 112.

Step S12: The master setting block 120 specifies the information of a demand forecast in the forecast master table 114.

Step S13: The master setting block 120 specifies a product supply plan for each product in the supply plan master table 113 in accordance with the information specified in the forecast master table 114. This processing is executed when the local time in the location where the order is accepted reaches the time included in the supply plan update time data 118.

The master information is specified as appropriate, as described above.

The allocation will be described next.

Figure 14:
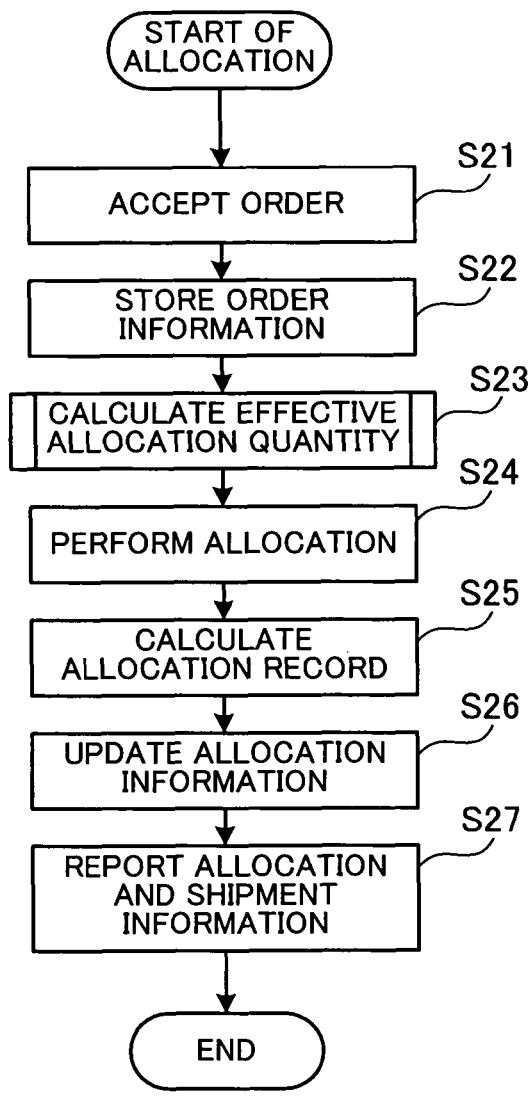
FIG. 14 is a flow chart showing an allocation procedure.

FIG. 14 is a flow chart showing an allocation procedure. The steps shown in FIG. 14 will be described in order of step number. The allocation is executed when order information is sent from the terminal 21 or 22 to the supply plan control server 100.

Step S21: The order acceptance block 130 accepts order information sent from the terminal 21 or 22.

Step S22: The order acceptance block 130 generates an order number corresponding to the accepted order information and stores a new record in the order information management table 115. The order acceptance block 130 also stores the order information in the order information table 116. If the order information includes orders for a plurality of products, the record of each product is stored in the order information table 116.

Step S23: The effective allocation quantity calculation block 140 calculates an effective allocation quantity. This step will be described later in further detail (see FIG. 15).

Step S24: The allocation block 150 allocates the product to the customer who has placed the order, in accordance with the order. The allocation is performed in accordance with the effective allocation quantity and the desired quantity in the order information. If the effective allocation quantity is greater than or equal to the desired quantity, the allocation block 150 allocates the desired quantity of the product to the customer. If the effective allocation quantity is smaller than the desired quantity, the allocation block 150 allocates the effective allocation quantity of the product to the customer.

Step S25: The allocation block 150 calculates the actual allocation quantity to the customer. To be more specific, the allocation block 150 selects the customer who has placed the order. The allocation block 150 subtracts the quantity allocated to the customer who has placed the order, from the planned allocation quantity for the customer (quantity derived from the planned supply quantity in accordance with the planned order quantity of the customer).

If the planned order quantity of the customer who has placed the order causes a shortage, the allocation block 150 selects the customers in order of priority level with reference to the column of priority level in the customer master table 111. The allocation block 150 then subtracts the shortage of the allocation quantity to the customer who has placed the order, from the planned allocation quantity for the selected customer by referring to the forecast master table 114.

Step S26: The allocation block 150 updates the allocation information. To be more specific, the allocation block 150 stores the results of allocation in the allocation information table 117. The allocation block 150 also stores the shipment date of the ordered product in the column of offered delivery date of the order information table 116.

Step S27: The allocation result reply block 160 sends the results of allocation and the delivery date to the terminal which has sent the order information.

The effective allocation quantity calculation will be described next in detail.

Figure 15:
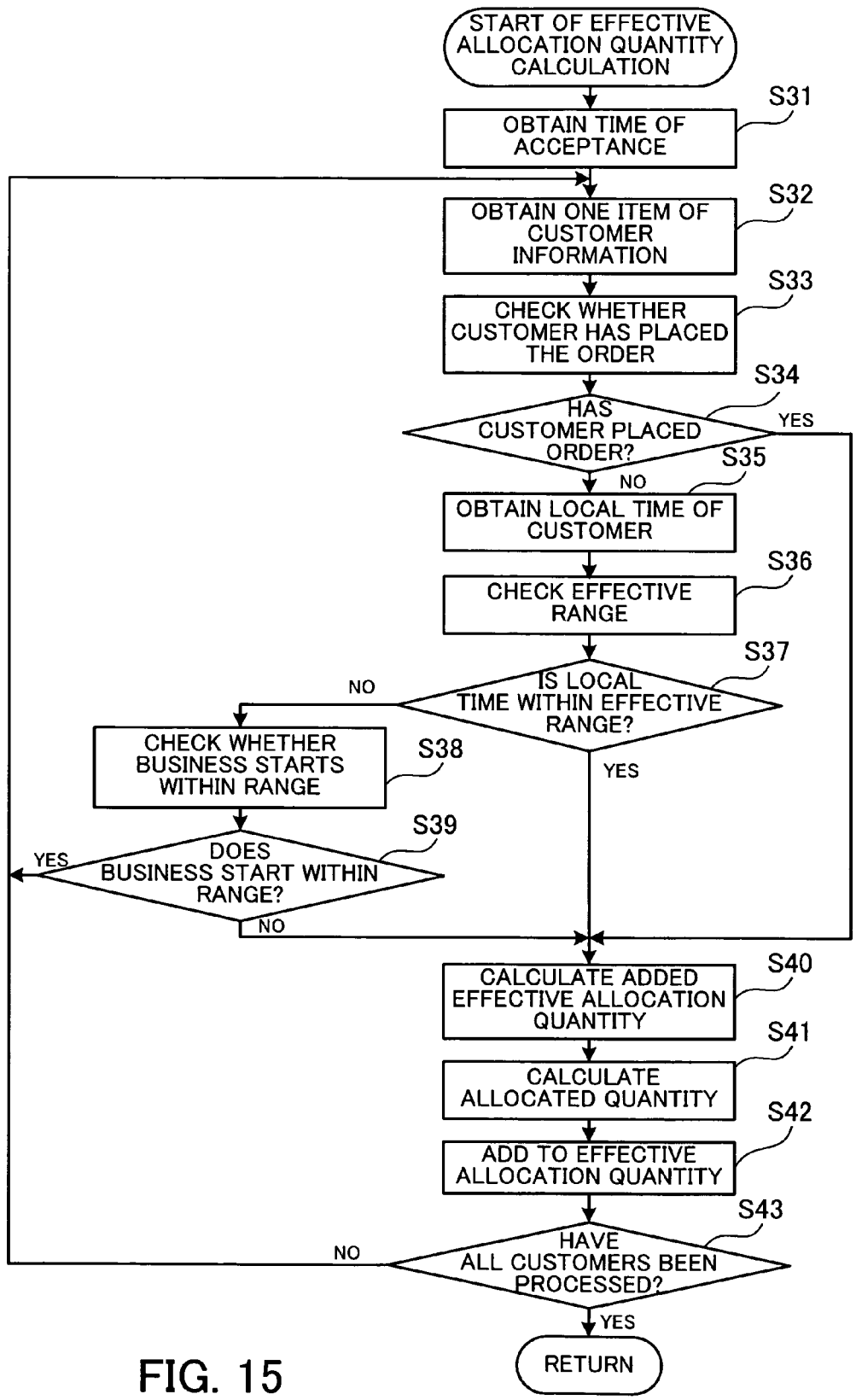
FIG. 15 is a flow chart showing a procedure for calculating an effective allocation quantity.

FIG. 15 is a flow chart showing a procedure for calculating the effective allocation quantity. The steps shown in FIG. 15 will be described in order of step number.

Step S31: The effective allocation quantity calculation block 140 extracts the time when newly acquired order information is received and the customer code of the customer who has placed the order, with reference to the order information management table 115.

Step S32: The effective allocation quantity calculation block 140 acquires customer information with reference to the customer master table 111. To be more specific, the effective allocation quantity calculation block 140 reads one item of customer information of the customer to which steps S33 to S42 have not yet been performed, from the customer master table 111.

Step S33: The effective allocation quantity calculation block 140 judges whether the customer information obtained in step S32 is of the customer who has placed the order. To be more specific, the effective allocation quantity calculation block 140 judges that the customer who has placed the order matches the allocation source customer (customer match) when the customer code extracted in step S31 matches the customer code extracted in step S32. If the customer code extracted in step S31 does not match the customer code extracted in step S32, the effective allocation quantity calculation block 140 judges that the customer who has placed the order does not match the allocation source customer.

Step S34: If it is determined that a customer match occurs in step S33, the effective allocation quantity calculation block 140 goes to step S40. If it is determined that a customer match does not occur in step S33, the effective allocation quantity calculation block 140 goes to step S35.

Step S35: The effective allocation quantity calculation block 140 obtains the local time of the customer who has placed the order. To be more specific, the effective allocation quantity calculation block 140 obtains the country code of the allocation source customer with reference to the customer master table 111. Then, the effective allocation quantity calculation block 140 obtains the time-zone difference of the country of the allocation source customer against the country where the order is accepted (in this example, Japan) in accordance with the country code obtained with reference to the country master table 112. The effective allocation quantity calculation block 140 calculates the local time in the country of the allocation source customer when the order information is accepted, from the time of acceptance and the time-zone difference.

Step S36: The effective allocation quantity calculation block 140 determines whether the time of acceptance of the order information is within the effective range for allocating the product provisionally allocated to the allocation source customer to the customer who has placed the order. In the shown example, if the time of acceptance of the order information is within the business hours of the allocation source customer, it is determined that the time is within the effective range. To be more specific, the effective allocation quantity calculation block 140 checks the business hours of the allocation source customer, with reference to the columns of start time and end time of the customer master table 111. The effective allocation quantity calculation block 140 judges whether the time is within the effective range by comparing the local time of the allocation source customer when the order information is accepted and the business hours.

Step S37: If the local time is within the effective range, the effective allocation quantity calculation block 140 goes to step S40. If the local time is outside the effective range, the effective allocation quantity calculation block 140 goes to step S38.

Step S38: The effective allocation quantity calculation block 140 checks whether the business starts before the supply plan is updated next. To be more specific, the effective allocation quantity calculation block 140 checks the date and time when the supply plan is updated next, with reference to the supply plan update time data 118. The effective allocation quantity calculation block 140 judges that the business starts earlier, with reference to the column of start time in the customer master table 111, if the supply plan is updated after the business starts next. If the supply plan is updated before the business starts next, the effective allocation quantity calculation block 140 judges that the business does not start earlier.

Step S39: If it is determined that the business starts earlier, the effective allocation quantity calculation block 140 goes to step S32. If it is determined that the business does not start earlier, the effective allocation quantity calculation block 140 goes to step S40.

Step S40: The effective allocation quantity calculation block 140 calculates an added effective allocation quantity. To be more specific, the effective allocation quantity calculation block 140 calculates a provisional allocation quantity for the allocation source customer with reference to the forecast master table 114. The provisional allocation quantity is given by the following formula:

Provisional allocation quantity=Planned supply quantity×(Planned order quantity for the allocation source customer+Total of planned order quantities of all the customers)

In the supply plan master table 113 shown in FIG. 7, the total of planned order quantities for all the customers is specified as the planned supply quantity. Accordingly, the provisional allocation quantity equals the planned order quantity for the allocation source customer. The planned supply quantity may not always match the total of planned order quantities of all the customers. The planned supply quantity may be a little greater than the total of planned order quantities. In that case, the provisional allocation quantity is greater than the planned order quantity for the allocation source customer.

Step S41: The effective allocation quantity calculation block 140 calculates an actually allocated quantity. To be more specific, the effective allocation quantity calculation block 140 sums up offered quantities in the allocation information corresponding to the allocation source customer, the allocation information including the same product name as the order information and the offered delivery date matching the desired delivery date in the order information. The sum becomes the actually allocated quantity.

Step S42: The effective allocation quantity calculation block 140 calculates the possible allocation quantity for the allocation source customer, and adds the possible allocation quantity to the effective allocation quantity. The possible allocation quantity equals the planned allocation quantity for the allocation source customer minus the allocated quantity.

Step S43: The effective allocation quantity calculation block 140 checks whether steps S33 to S42 have been executed for all the customers included in the customer master table 111. If yes, the effective allocation quantity calculation ends. If the processing has not been executed for a customer, the processing goes to step S32.

Allocation based on the order is performed as described above. An example of allocation based on the order will be described next.

Figure 16:
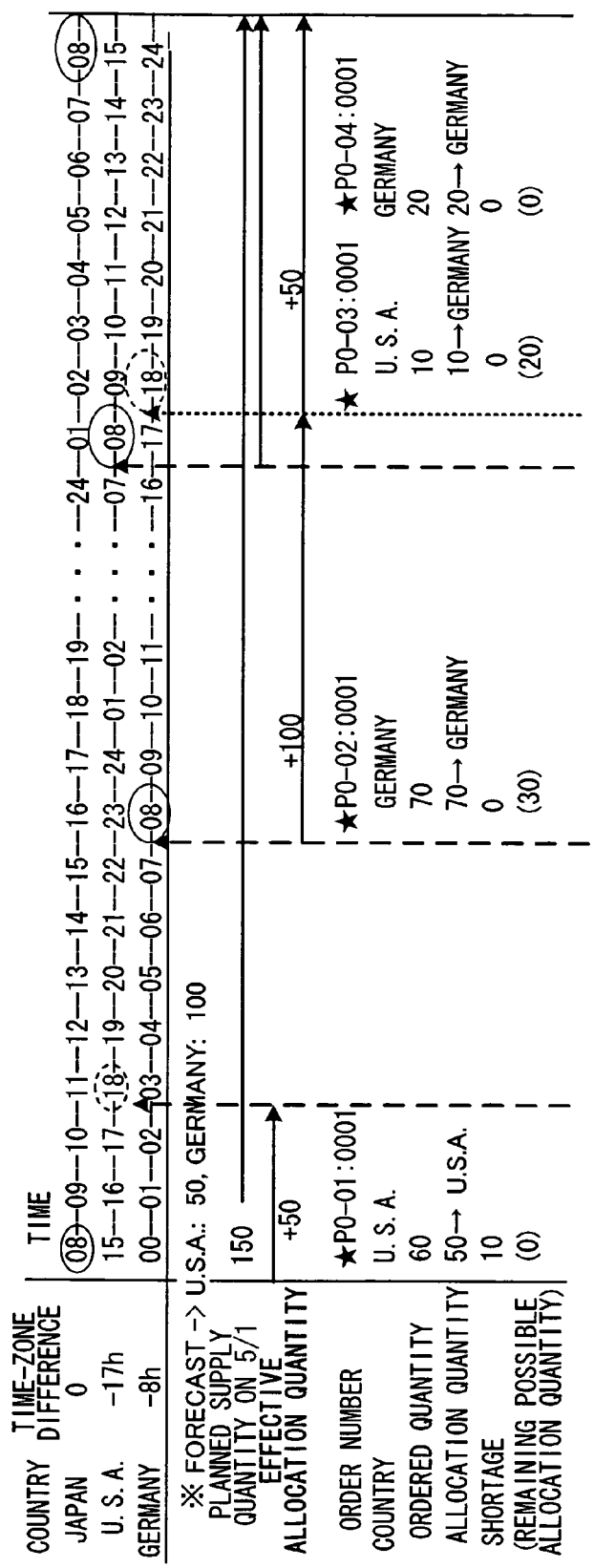
FIG. 16 is a view showing an example of allocation based on orders.
Figure 17:
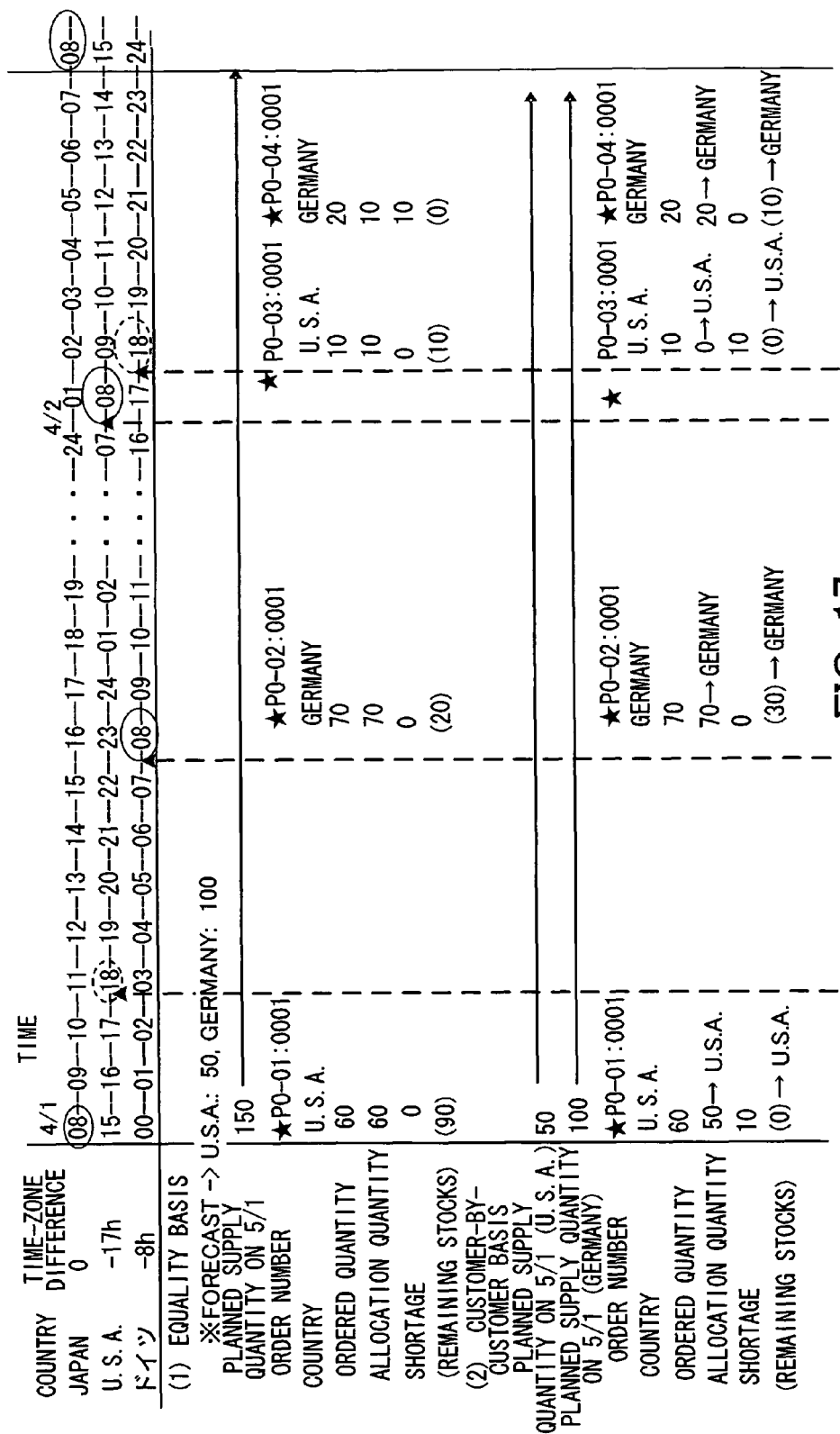
FIG. 17 is a view showing examples of product allocation by conventional inventory-and-supply control methods.

FIG. 16 is a view showing an example of allocation based on orders. The example shows the order acceptance and allocation from 8:00 on April 1 Japan Time to 8:00 on April 2 Japan Time, of the product to be supplied on May 1. In the forecast, 150 pieces are produced to be sold on May 1, 50 pieces are to be supplied to the American customer, and 100 pieces are to be supplied to the German customer. The order information entered from the terminals 21 and 22 matches the information in the order information management table 115 shown in FIG. 9 and the order information table 116 shown in FIG. 10.

In FIG. 16, the country name, ordered quantity, allocation quantity, shortage, and remaining possible allocation quantity are indicated below the order number.

Allocation based on the first order (order number P0-01: 0001) will be described first. The first order for 60 pieces is placed by the American customer, and the supply plan control server 100 accepts the order at 9:00 on April 1 Japan Time.

The planned allocation quantity for the American customer who has placed the order is 50 pieces. The quantity actually allocated from the possible allocation quantity of the American customer is "0". Accordingly, the possible allocation quantity from the American customer is 50−0=50.

The German customer has not placed an order not processed, and it is checked whether the pieces reserved as the possible allocation quantity can be allocated. The German customer is not servicing, and the time-zone difference is 8 hours. The business starts at 16:00 on April 1, which is earlier than 8:00 on April 2, the time when the supply plan is updated next. Accordingly, the quantity that can be allocated from the German customer is "0".

Accordingly, the effective allocation quantity for the first order is 50+0=50, and 50 pieces are allocated from the planned allocation quantity for the American customer. This reduces the planned allocation quantity for the American customer to "0". The American customer is short by 10 pieces.

Allocation based on the second order (order number P0-02: 0001) will be described next. The second order for 70 pieces is placed by the German customer, and the supply plan control server 100 accepts the order at 17:00 on April 1 Japan Time.

The planned allocation quantity for the German customer is 100 pieces. The quantity actually allocated from the planned allocation quantity of the German customer is "0,". Accordingly, the quantity that can be allocated from the German customer is 100−0=100.

Because the American customer has not placed an order not processed, it is checked whether the pieces reserved as the planned allocation quantity can be allocated. The American customer is not servicing, and the time-zone difference is 17 hours. The business starts at 1:00 on April 2, which is earlier than 8:00 am on April 2, when the supply plan is updated next. Accordingly, the quantity that can be allocated from the American customer is "0".

Consequently, the effective allocation quantity for the second order is 100+0=100. From the planned allocation quantity for the German customer, 70 pieces are allocated, and 30 pieces remain as the possible allocation quantity for the German customer.

Allocation based on the third order (order number P0-03: 0001) will be described. The third order for 10 pieces is placed by the American customer, and the supply plan control server 100 accepts the order at 2:00 on April 2 Japan Time.

The planned allocation quantity for the American customer who has placed the order is 50 pieces. The quantity actually allocated from the planned allocation quantity for the American customer is "50". Accordingly, the quantity that can be allocated from the American customer is 50−50=0.

The German customer has not placed an order not processed, and it is checked whether the pieces reserved as the planned allocation quantity can be allocated. The German customer is servicing, and allocation from the German customer is possible. The planned allocation quantity for the German customer is 100 pieces, and the quantity actually allocated from the planned allocation quantity for the German customer is "70". Accordingly, the quantity that can be allocated from the German customer is 100−70=30.

As a result, the effective allocation quantity for the third order becomes 0+30=30. From the planned allocation quantity for the German customer, 10 pieces are allocated to the American customer, and 20 pieces remain as the possible allocation quantity for the German customer.

Allocation based on the fourth order (order number P0-04: 0001) will be described. The fourth order for 20 pieces is placed by the German customer, and the supply plan control server 100 accepts the order at 5:00 on April 2 Japan Time.

The planned allocation quantity for the German customer who has placed the order is 100 pieces. The quantity actually allocated from the planned allocation quantity for the German customer is "80". Accordingly, the quantity that can be allocated from the German customer is 100−80=20.

The American customer has not placed an order not processed, and it is checked whether the pieces reserved as the planned allocation quantity can be allocated. The American customer is servicing, and allocation from the American customer is possible. The planned allocation quantity for the American customer is 50 pieces. The quantity actually allocated from the planned allocation quantity for the American customer is "50". Accordingly, the quantity that can be allocated from the American customer is 50−50=0.

As a result, the effective allocation quantity for the fourth order becomes 20+0=20. From the planned allocation quantity for the German customer, 20 pieces are allocated, and the possible allocation quantity for the German customer is reduced to "0".

The shortage of an order is offset by allocation from the supply plan of which desired delivery date is the next day or later.

With order allocation according to the present embodiment, if the American customer places an order exceeding the forecast while the German customer is not servicing, the quantity reserved in accordance with the forecast for the German customer is not affected. The planned allocation quantity for the German customer is reserved in a period preceding the business hours, that is a period in which an opportunity to place an order within the certain period is not given. Such inequality due to a time-zone difference among the customers that the planned allocation quantity for a customer is allocated to another customer in another country before a customer has an opportunity to place an order can be eliminated.

If the American customer places an order exceeding the forecast while the German customer is servicing, the surplus of the German customer can be allocated to the American customer. A customer who is servicing or finishes the day's business in the certain period has had an opportunity to place an order, and the surplus of the customer is allocated to another customer. This saves the supplier from missing a business opportunity and the supplier from carrying surplus stock.

The processing functions described above can be implemented by a computer. A program provided for that purpose describes the processing functions the supply plan control apparatus should implement. When the program is executed on the computer, the processing functions are implemented on the computer. The program describing the processing can be recorded on a computer-readable recording medium. Computer-readable recording media includes magnetic recording devices, optical discs, magneto-optical recording media, and semiconductor memories. The magnetic recording devices include hard disk drives (HDDs), flexible disks (FDs), and magnetic tapes. The optical discs include digital versatile discs (DVDs), DVD-random access memories (DVD-RAMs), compact disc read only memories (CD-ROMs), CD-recordables (CD-Rs), and CD-rewritables (CD-RWs). The magneto-optical recording media include magneto-optic disks (MOs).

The program is distributed and sold in forms of transportable recording media such as DVDs and CD-ROMs which record the program. The program can also be stored in a storage device of a server computer and can be transferred from the server computer to another computer through a network.

The computer which executes the program stores the program recorded on the transportable recording medium or the program transferred from the server computer in its internal storage device. The computer reads the program from its internal storage device and executes the programmed processing. The computer can also read the program directly from the transportable recording medium and execute the programmed processing. The computer can also execute the programmed processing each time the program is transferred from the server computer.

According to the present invention, the subject of transaction is allocated from the planned allocation quantity for a customer servicing at the time when an order is accepted, in accordance with the order. The subject of transaction reserved as the planned allocation quantity for a customer will be kept while the customer is not servicing and will not be allocated to another customer. As a result, inequality due to a time-zone difference among the locations of customers can be eliminated, and the supplier will not let business opportunities get away.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A supply plan control method for a computer to manage a supply plan of a subject of transaction with a plurality of customers, the supply plan control method comprising:
storing a planned supply quantity of the subject of transaction to be supplied in a specified period;
calculating, with the computer, a planned allocation quantity for each individual customer by distributing the planned supply quantity to the customers according to a forecast;
storing, for each individual customer, records of the planned allocation quantity that is calculated, an allocated quantity that indicates how much part of the planned allocation quantity has been allocated, and local business hours;
accepting an order placed by one of the customers, the order specifying an order quantity of the subject of transaction;
examining, in response to the order, the stored records of local business hours of each individual customer to identify the customers who are at work at a moment when the order has been accepted, the identified customers including the ordering customer who has placed the order;
calculating, for each of the identified customers, a possible allocation quantity by subtracting the allocated quantity from the planned allocation quantity which are indicated in the stored records;
calculating an effective allocation quantity by summing up the possible allocation quantities of the identified customers;
allocating the effective allocation quantity to the order of the ordering customer to fulfill the specified order quantity; and updating the stored records of allocated quantities of the identified customers so as to reflect the quantity that the allocating has actually allocated to the order.

2. The supply plan control method according to claim 1, wherein the examining further identifies the customers who are not at work at the moment when the order has been accepted and will not be at work until next update of the planned supply quantity.

3. The supply plan control method according to claim 1, wherein the planned supply quantity is a total of planned order quantities for all customers within the specified period.

4. The supply plan control method according to claim 1, wherein the planned supply quantity is calculated by summing up planned order quantities for all the customers within the specified period and multiplying the sum by a specified coefficient.

5. The supply plan control method according to claim 1, wherein:
 each of the customers has a planned order quantity which is expected to be ordered during the specified period; and
 the calculating of the planned allocation quantity divides the planned order quantity of one of the customers by a total of the planned order quantities of all the customers and multiplies the planned supply quantity by the quotient.

6. The supply plan control method according to claim 1, wherein the plurality of customers include a virtual customer whose record of local business hours specifies a whole day, so that the planned allocation quantity of the virtual customer can be allocated to orders of any other customers regardless of when the orders are accepted.

7. The supply plan control method according to claim 1, wherein:
 priority levels are previously assigned to the customers, and
 the updating first updates the record of the allocated quantity of the ordering customer by adding thereto the quantity actually allocated to the order within a limit of the planned allocation quantity of the ordering customer, and then updates the records of the allocated quantities of one or more other identified customers selected according to the previously assigned priority levels, by distributing thereto a remaining part of the quantity actually allocated to the order.

8. A computer-readable, non-transitory medium storing a supply plan control program for managing a supply plan of a subject of transaction with a plurality of customers, the supply plan control program causing a computer to execute a procedure comprising:
 storing a planned supply quantity of the subject of transaction to be supplied in a specified period;
 calculating a planned allocation quantity for each individual customer by distributing the planned supply quantity to the customers according to a forecast;
 storing, for each individual customer, records of the planned allocation quantity that is calculated, an allocated quantity that indicates how much part of the planned allocation quantity has been allocated, and local business hours;
 accepting an order placed by one of the customers, the order specifying an order quantity of the subject of transaction;
 examining, in response to the order, the stored records of local business hours of each individual customer to identify the customers who are at work at a moment when the order has been accepted, the identified customers including the ordering customer who has placed the order;
 calculating, for each of the identified customers, a possible allocation quantity by subtracting the allocated quantity from the planned allocation quantity which are indicated in the stored records;
 calculating an effective allocation quantity by summing up the possible allocation quantities of the identified customers;
 allocating the effective allocation quantity to the order of the ordering customer to fulfill the specified order quantity; and
 updating the stored records of allocated quantities of the identified customers so as to reflect the quantity that the allocating has actually allocated to the order.

9. A supply plan control apparatus for managing a supply plan of a subject of transaction with a plurality of customers, the supply plan control apparatus comprising:
 a supply plan information storage section to store information about a planned supply quantity of the subject of transaction to be supplied in a specified period as well as storing, for each individual customer, records of a planned allocation quantity that is calculated by distributing the planned supply quantity to the customers according to a forecast, an allocated quantity that indicates how much part of the planned allocation quantity has been allocated, and local business hours;
 an order accepting section to accept an order placed by one of the customers, the order specifying an order quantity of the subject of transaction; a customer extraction section to examining, in response to the order, the stored records of local business hours of each individual customer to identify the customers who are at work at a moment when the order has been accepted, the identified customers including the ordering customer who has placed the order;
 a quantity determination section to calculate, for each of the identified customers, a possible allocation quantity by subtracting the allocated quantity from the planned allocation quantity which are read out of the supply plan information storage section, and to calculate an effective allocation quantity by summing up the possible allocation quantities of the identified customers;
 an allocation section to allocate the effective allocation quantity to the order of the ordering customer to fulfill the specified order quantity; and
 an allocated quantity specification section to update the stored records of allocated quantities of the identified customers so as to reflect the quantity that the allocating has actually allocated to the order.

\* \* \* \* \*